US008627576B2

(12) United States Patent
Engel

(10) Patent No.: US 8,627,576 B2
(45) Date of Patent: Jan. 14, 2014

(54) COORDINATE MEASURING DEVICE HAVING POSITIONAL CHANGE SENSORS

(75) Inventor: Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 28 days.

(21) Appl. No.: 13/434,142

(22) Filed: Mar. 29, 2012

(65) Prior Publication Data

US 2012/0246953 A1    Oct. 4, 2012

Related U.S. Application Data

(63) Continuation of application No. PCT/EP2010/064869, filed on Oct. 6, 2010.

(30) Foreign Application Priority Data

Oct. 6, 2009    (DE) .......................... 10 2009 049 534

(51) Int. Cl.
*G01B 21/04* (2006.01)
*G01B 7/008* (2006.01)

(52) U.S. Cl.
USPC .......................................................... 33/503

(58) Field of Classification Search
USPC ............................. 33/503, 556, 558, 559, 561
See application file for complete search history.

(56) References Cited

U.S. PATENT DOCUMENTS

| 3,888,012 A | * | 6/1975 | Droz | 33/557 |
|---|---|---|---|---|
| 4,279,080 A | * | 7/1981 | Nakaya | 33/561 |
| 4,585,350 A | * | 4/1986 | Pryor | 356/625 |
| 4,882,848 A | * | 11/1989 | Breyer et al. | 33/559 |
| 4,908,951 A | * | 3/1990 | Gurny | 33/503 |
| 5,012,591 A | * | 5/1991 | Asakawa | 33/832 |
| 5,024,003 A | * | 6/1991 | Breyer | 33/561 |
| 5,222,034 A | * | 6/1993 | Shelton et al. | 702/152 |
| 5,251,156 A | * | 10/1993 | Heier et al. | 702/167 |
| 5,471,406 A | * | 11/1995 | Breyer et al. | 702/168 |

(Continued)

FOREIGN PATENT DOCUMENTS

| DE | 43 42 312 A1 | 6/1995 |
|---|---|---|
| DE | 196 37 554 A1 | 3/1997 |

(Continued)

OTHER PUBLICATIONS

ISA/EP; English language translation of International Preliminary Report on Patentability (Chapter 1) issued by WIPO Apr. 11, 2012; 13 pages.

(Continued)

*Primary Examiner* — Christopher Fulton
(74) *Attorney, Agent, or Firm* — Harness, Dickey & Pierce, P.L.C.

(57) ABSTRACT

The present invention relates to a coordinate measuring machine having a sensor for measuring an object, and having a housing structure for holding and positioning the sensor, wherein a position change sensor is provided in order to detect a change in position of the sensor and of the housing structure. Further, the invention relates to a method for collision detection of a coordinate measuring machine. Last, the invention relates to a method for correcting data of a sensor, measuring in a contactless fashion, in particular an optical sensor, of a coordinate measuring machine. The method according to the second and the third aspects can be executed on a coordinate measuring machine according to the first aspect.

8 Claims, 5 Drawing Sheets

(56) References Cited

U.S. PATENT DOCUMENTS

| | | | |
|---|---|---|---|
| 5,579,246 A | 11/1996 | Ebersbach et al. | |
| 5,778,549 A | 7/1998 | Campanile | |
| 6,044,569 A * | 4/2000 | Ogihara et al. | 33/503 |
| 6,158,136 A * | 12/2000 | Gotz et al. | 33/503 |
| 6,490,912 B1 | 12/2002 | Volk | |
| 7,296,363 B2 * | 11/2007 | Danisch et al. | 33/556 |
| 7,599,813 B2 * | 10/2009 | Grupp | 702/152 |
| 7,660,688 B2 * | 2/2010 | Ishikawa et al. | 702/95 |
| 8,006,398 B2 * | 8/2011 | McFarland et al. | 33/503 |
| 8,104,189 B2 * | 1/2012 | Tait | 33/503 |
| 2002/0095975 A1 | 7/2002 | Nai | |
| 2007/0028677 A1 * | 2/2007 | McFarland et al. | 73/105 |
| 2007/0068024 A1 * | 3/2007 | Fuge et al. | 33/559 |
| 2009/0030648 A1 * | 1/2009 | Hunter et al. | 702/152 |

FOREIGN PATENT DOCUMENTS

| | | |
|---|---|---|
| DE | 199 52 592 C1 | 5/2001 |
| DE | 100 30 570 A1 | 1/2002 |
| DE | 10 2005 005 230 A1 | 8/2006 |
| DE | 10 2007 053 546 A1 | 3/2009 |
| DE | 10 2007 051 984 A1 | 5/2009 |
| GB | 2 045 938 A | 11/1980 |
| JP | 9-081790 | 3/1997 |
| JP | 9-257461 | 10/1997 |
| WO | WO 2007/015677 A1 | 2/2007 |

OTHER PUBLICATIONS

English translation of first Office Action from German Patent and Trademark Office; Jun. 29, 2010; 4 pages.

* cited by examiner

COORDINATE MEASURING DEVICE HAVING POSITIONAL CHANGE SENSORS

CROSS-REFERENCE TO RELATED APPLICATIONS

This is a continuation application of International patent application PCT/EP2010/064869, filed Oct. 6, 2010, which was published in German and claims the priority of German patent application DE 10 2009 049 534.7, filed Oct. 6, 2009. The entire contents of these priority applications are incorporated herein by reference.

BACKGROUND OF THE INVENTION

The present invention relates to a coordinate measuring machine having a sensor for measuring an object, and having a housing structure for holding and positioning the sensor.

Further, the present invention relates to a method for collision detection of a coordinate measuring machine having a tactile sensor for measuring an object, and having a housing structure for holding and positioning the tactile sensor.

Furthermore, the present invention relates to a method for correcting image data of a sensor, measuring in a contactless fashion, in particular an optical sensor, of a coordinate measuring machine.

Three-dimensional coordinate measuring machines having up to six degrees of freedom are used in wide areas of industrial metrology, in order to measure objects under the highest accuracy requirements. For example, a shape of workpieces produced by machine is checked in this way for quality control. To this end, coordinate measuring machines are known in principle that operate, for example, with optical sensors, or else with tactile sensors.

As a rule, the optical sensors are optical probe heads such as, for example, triangulation sensors or video cameras that have an electronic evaluation unit. In the example of a video camera, a system clock of this electronic evaluation unit is fixed by the video frequency of the camera. Such optical sensors can be advantageous when the aim is to measure an object in a contactless fashion. However, optical sensors encounter limits when objects of complex shapes are to be measured, since what can then happen is that details of the object do not lie in an image recording area of the optical sensor, and therefore cannot be detected.

Such optical sensors are, for example, sold by the applicant under the designation of "ViSCAN®".

A tactile sensor is provided, as a rule, in the form of a probe tip that is mounted with the ability to be deflected in three dimensions, and whose deflection can be detected by means of the tactile sensor. For the measurement operation, the probe tip or the feeler is moved so far up to the object to be measured that it touches a desired measurement point on the object. The probe tip and the sensors detecting the deflection of the probe tip are also denoted together as probe head. As a rule, the probe head is fitted in a suitable displacement device that enables a three-dimensional movement of the probe head with up to six degrees of freedom. The spatial coordinate of a probed measurement point can be determined with high accuracy from the respective position of the probe head and the relative position of the feeler pin relative to the probe head, which is detected with the aid of the sensor.

Tactile sensor are described, for example, in document DE 10 2004 011 728 A1, and are, for example, sold by the applicant under the designation of "VAST® XXT".

In order to be able to fulfill the high demands for accuracy placed on the measurement results in the case of such tactile or optical sensors, it is necessary to be able to accurately detect a movement of the sensor during a measurement operation. With tactile sensors, movements of the sensor during touching or probing can lead to distortions that necessarily must be taken into account in an evaluation of the measurement results. For optical sensors, for example for CCD cameras, a movement during the measurement operation leads to a "smearing" of the recorded image which then appears unsharp. Although it is possible to eliminate from the measurement result the movement of a sensor during the measurement operation by subsequent computational after processing, it is at the expense of absolutely requiring adequately exact knowledge of the movement operation and/or the path data of the sensor during measurement.

In order to displace the tactile and the optical sensors, a housing structure that enables a displacement of the sensors in all three spatial directions (X, Y, Z) is routinely provided. Furthermore, it is possible to provide a so-called rotating/pivoting joint (DSG) that enables the sensor to be aligned along a desired direction vector. By way of example, such a DSG is sold by the applicant under the designations of "DSE" and "RDS".

During the operation of a coordinate measuring machine, the position of the sensor or of the sensor head is typically determined along the three spatial directions and stored in the form of position data. Use is made to this end of linear or rotational measurement systems which determine the position and orientation, respectively, with a readout clock typical of the coordinate measuring machine. This readout clock is typically in a frequency range of from a few tens of hertz (Hz) up to a few kilohertz (kHz).

The position data are used for the purpose of creating a position profile and, by differentiating this variable, of calculating the speed, or, by renewed differentiation, of calculating the acceleration of the sensor or of the housing structure. In this case, however, the speed or the acceleration of the sensor or of the housing structure is not acquired directly. Owing to the fact that the temporal variation in the position of the sensor requires the measurement of a plurality of positions which are present only in a limited number, and thus density, because of the measurement frequency of the readout rate, the variation and/or differentiation also can be determined only with limited resolution. As is generally known on the basis of the Nyquist theorem, there is, however, a need for a minimum resolution in order to be able to detect dynamic changes and/or wave movements. Because of the limited resolution, discontinuous changes such as arise in the event of mechanical probing and/or collision also can only be detected with difficulty at present or must have a certain minimum size in order to be detected.

Because of structural boundary conditions, the Abbe's comparator principle is, in addition, violated in the case of most position determining systems of coordinate measuring machines during construction. Consequently, a distortion of the system can give rise to tilt errors during measurement, and dynamic effects can be taken into account only conditionally. Although these effects are at present approximately described via model parameters and taken into account as correction values during measurement, knowledge of the actual circumstances is desirable for an accurate measurement, since a dynamic distortion of the coordinate measuring machine can certainly amount to several µm, however.

It would then be possible to monitor more effectively the probing behavior of a tactile sensor or the path data of a sensor that measures in a contactless fashion, and to correct more effectively the measurement results of both tactile and, in particular, optical sensors in order thus to obtain more accurate measurement results.

An objective object of the present invention therefore firstly consists in more effectively determining a movement behavior of a sensor of a coordinate measuring machine of the type mentioned at the beginning.

A further objective object consists in using the movement behavior thus known to more effectively monitor the touching of a tactile sensor.

Yet a further object of the present invention therefore consists in using the movement behavior thus known to more effectively correct the measurement results of a sensor that measures in a contactless fashion, in particular an optical sensor.

BRIEF SUMMARY OF THE INVENTION

According to one aspect of the invention, there is provided a coordinate measuring machine having a sensor for measuring an object, and having a housing structure for holding and positioning the sensor, wherein at least one position change sensor is provided in order to detect a change in position of the sensor and of the housing structure, wherein the sensor for measuring the object is a tactile sensor, and a first position change sensor is provided in order to detect a first acceleration of the housing structure, and at least one second position change sensor is provided in order to detect a second acceleration of the tactile sensor, wherein a direction of the first acceleration and a direction of the second acceleration are identical.

According to a further aspect, there is provided a coordinate measuring machine having a sensor for measuring an object, and having a housing structure for holding and positioning the sensor, wherein at least one position change sensor is provided in order to detect a change in position of the sensor and of the housing structure.

In this case, a "position change sensor" is to be understood as one that directly detects a change in position. A "change in position" is to be understood here in the context of the present invention both as a speed and as an acceleration. In the context of the present invention, speed sensors and acceleration sensors are therefore jointly denoted by the term "position change sensor".

A "sensor" in the context of the present invention is to be understood as any tactile sensor and/or one that measures in a contactless fashion, in particular optically, or else a sensor of another type in the narrower sense, that is to say in the case of optical sensors, for example, the camera itself, and in the case of tactile sensors the feeler with the sensors that detect the deflection of the feeler. The remaining holding and mounting means as well as the displacing device for moving the sensor are jointly denoted as housing structure.

Owing to the direct detection of a change in position at the sensor and the housing structure, it is possible to detect with substantially greater resolution and accuracy a movement behavior of the sensor during a measurement operation than has been the case by differentiation of position data. Not only are changes in the movement behavior therefore more quickly detected, but it is possible in addition to directly detect dynamic operations with higher frequencies and discontinuous changes in the movement behavior, for example collisions, and to take these into account in the controlling of the coordinate measuring machine and the evaluation of the measurement results.

According to a further aspect of the invention, there is provided method for collision detection of a coordinate measuring machine having a tactile sensor for measuring an object, and having a housing structure for holding and positioning the tactile sensor, having the following steps:
determining at least one change in position of the tactile sensor and of the housing structure by means of at least one position change sensor,
comparing the at least one change in position with at least one corresponding desired value, and
putting the coordinate measuring machine into a safe state if the at least one change in position deviates by a predetermined measure from the at least one corresponding desired value,
wherein a first acceleration of the tactile sensor is measured by means of at least one first position change sensor, and wherein at least one second acceleration of the housing structure is measured by means of at least one second position change sensor, the first acceleration being the desired value, and the second acceleration being compared with the desired value.

According to a further aspect of the present invention, there is provided a method of the type mentioned at the beginning and having the following steps:
determining at least one change in position of the tactile sensor and of the housing structure by means of at least one position change sensor,
comparing the at least one change in position with at least one corresponding desired value, and
putting the coordinate measuring machine into a safe state if the at least one change in position deviates by a predetermined measure from the at least one corresponding desired value.

To detect collisions, it is possible to use all accelerations that are greater than the maximum machine acceleration. If, in addition, the measurement unit is further supplied with information as to which acceleration is currently being conducted, the coordinate measuring machine can detect a deviation in direction and/or amplitude as a possible collision, and thus immediately bring the machine into a safe state, for example effect free-running of the appropriate axis, or stop the movement of the coordinate measuring machine.

A further important information item can be obtained from the detection of the acceleration at or in the vicinity of the tactile sensor. Owing to unavoidable compliances in the coordinate measuring machine, a movement of the sensor is not necessarily the same as a movement of the coordinate axes or measurement axes of the position sensors. However, by measuring the acceleration data indirectly, it is possible for them to be determined in the vicinity of the measurement location, and thus to be determined independently of or in a complementary fashion to model parameters of the coordinate measuring machine.

Thus, the signals detected by means of the position change sensors can be used in order to determine the instantaneous position and orientation of the sensor, to monitor the drive behavior of the coordinate measuring machine with reference to the acceleration and/or speed actually active at the sensor, and to monitor discontinuities in the drive behavior, for example jerking, slipping or frequency excitations. In particular, it is thus rendered possible to optimize the drive behavior of the entire coordinate measuring machine in a self-learning fashion so as to arrive at an optimum measurement performance with reference to accuracy and/or speed. Since actual accelerations at the sensor are known, it is possible to dispense with a complicated development of model parameters for the coordinate measuring machine. In addition, the coordinate measuring machine can optimize itself with the aid of the actual acceleration data. Furthermore, it is thus also possible to avoid problems in the modeling such as, for example, a manufacturing tolerance, where prescribed fixed parameter sets do not lead to satisfactory results.

According to a further aspect of the invention, a method is provided for correcting data of a sensor of the type mentioned at the beginning, measuring in a contactless fashion, in particular an optical sensor, which method is executed with the following steps:

starting a measurement operation on the basis of a start signal, measuring at least one change in position by means of at least one position change sensor, a time profile of the change in position being detected as position change data, stopping the measurement operation on the basis of a stop signal, calculating path data of the optical sensor by means of integrating the position change data, and deconvoluting the image data by means of the path data.

In this way, it is possible for the movement profile of the coordinate measuring machine actually to be determined during the recording of measurement data by means of an optical sensor, for example during an exposure time of the optical sensor. Typical exposure times lie in the range from 10 to 20 ms for normal frame rates of 50 Hz. This corresponds to only individual or a few system clocks. The recorded image is smeared by the movement during the image recording and appears unsharp. This effect can now be corrected subsequently, since it is possible to directly determine the actual movement path of the sensor, at least its relative path between the start and end of the exposure time. It is obvious that the computational correction can be performed more effectively, the more accurately it is possible to determine the data of the movement path. The direct detection of the change in position is much superior in this case to the determination of position change data by differentiation of the position data.

Thus, the inventive method is used, for the period of a measurement, to determine the path of the movement of the coordinate measuring machine or of the optical sensor, and said path is then made available in the suitable form, for example as path data. These path data can be obtained, for example, from single integration of a speed signal or, preferably, from double integration of the acceleration signal. These signals can then be used, for example, to correct a machine movement originally used as a basis for the description, for example a uniform movement.

In order to ensure invariable connection conditions, it is possible during the calculation to also use the measurement signals of the displacement device in order to obtain invariable connection conditions for the correction signal by means of nodes in the system clock or in a multiplicity of system clocks that extend, for example, over the image recording period. The appropriate integration constants are lacking at first in the integration, which can then be determined at known nodes, or be set to zero. It can be provided in this case that a path of the coordinate measuring machine determined via the path data is permitted to deviate from the difference between the start and target points only by a given error tolerance. For uniform movements, the zero could be reached as difference in the ideal case, while for accelerated movements it may be necessary to reckon with deviations that depend on control data of the displacement frame.

If the speed of the sensor is known in vector form at the beginning of the operation, which ought usually to be the case, it is possible to proceed from this vector and use the determined acceleration data to determine the actual relative path of the sensor, that is to say the path between the beginning and the end of the measurement. The relative path is sufficient for correcting the image, there being no need for absolute coordinates. These path data can then be used for correction in the subsequent numerical image processing. The subsequent mathematical correction of the image data is carried out via a so-called unfolding of path movement and image information. This procedure is also designated as deconvolution.

It follows that it is possible in principle to correct the data, in particular image data, of sensors of all sorts that measure in a contactless fashion, in particular, however, data of optical sensors. Better results can be obtained overall than has been the case to date via movement models of the coordinate measuring machine.

In a refinement, a plurality of position change sensors can be provided in order to detect a change in position of the sensor and of the housing structure in three spatial directions.

If only one position change sensor is provided, the latter should be arranged so that it is possible to detect speeds and/or accelerations in the measuring direction at the coordinate measuring machine. However, the system should advantageously detect speeds and/or accelerations in all three spatial directions, in order thus to be able to detect unplanned deviations, such as transverse movements, for example, as well.

In this case, the position change sensors can be designed to detect a linear and/or rotational acceleration. It is possible to provide only linear position change sensors or only rotational position change sensors, although it is, of course, also possible to combine linear and rotational position change sensors in a suitable way, for example to provide one linear and two rotational position change sensors. Of course, it is also possible in principle to provide up to three linear position change sensors and, in addition, also three rotational position change sensors, for example when increased detection accuracy is required for a specific coordinate measuring machine.

It is possible in principle to make use of position change sensors for detecting a speed, or of position change sensors for detecting an acceleration. However, it is preferred to use position change sensors that detect an acceleration.

In principle, the variation in the acceleration, for example in the event of probing or collisions, is greatest, and can therefore be best detected. In technical terms, the evaluation of the variation in the acceleration is therefore advantageous since, as second time derivative of the position, it displays the greatest variation. A measurement and evaluation of a speed profile is certainly equally suitable, but not so sensitive, since it is only the first time derivative of the position. Position change sensors, that is to say speed or acceleration sensors, are freely available on the market, and are therefore known to the average person skilled in the art, and no further description is required at this juncture. A selection of possible position change sensors can be gathered from the following table:

TABLE 1

| Type | Manufacturer | Axes | Technology | Measurement range | Sensitivity/Resolution |
|---|---|---|---|---|---|
| ADXRS 613 | Analog Devices | Single Axis (YAW) | MEMS | +/−150°/s | 12.5 mV/°/s |
| XV-3500CB | Seiko-Epson | Single Axis (YAW) | Quartz crystal | +/−100°/s | 0.67 mV/°/s |
| IDG-1123 | Invensense | Dual Axis (Roll + PITCH) | MEMS | +/−43°/s | 23 mV/°/s |
| ENC-03R | Murata | Single Axis (PITCH) | Quartz crystal | +/−300°/s | 0.67 mV/°/s |
| CG-L43 | NEC-TOKIN | Single Axis (YAW) | Quartz crystal | +/−90°/s | 0.66 mV/°/s |
| EWTS-98 | Panasonic | Dual Axis (Roll + PITCH) | MEMS | +/−15°/s (98C) +/−30°/s (98L) +/−300°/s (98V) | 65 mV/°/s (98C) 38 mV/°/s (98L) 2 mV/°/s (98V) |
| CRG-20-01 | Silicon Sensing | Single Axis (YAW) | MEMS | +/−75°/s | 26.67 mV/°/s or 8.3 mV/°/s |
| LPR-503AL | ST-Micro | Dual Axis (Pitch + YAW) | MEMS | +/−30°/s or +/−120°/s | 33.3 mV/°/s or 8.3 mV/°/s |

Here, the designation "single axis" stands for sensors that detect accelerations about one axis, and the designation "dual axis" stands for sensors that detect an acceleration about two axes. With reference to the axes, the designation "YAW" in this case stands for a yawing movement, the designation "roll" for a rolling movement, and the designation "PITCH" for a pitching movement. The abbreviation "MEMS" stands in this case for a microelectromechanical system. The abbreviation "SPI" stands in this case for "System Packet Interface", an optical interface. The abbreviation "I2C" stands for a serial interface standard of the Philips Company.

In a refinement of the invention, the sensor for measuring the object is a tactile sensor, and a first position change sensor is provided in order to detect a first acceleration of the housing structure, and at least one second position change sensor is provided in order to detect a second acceleration of the tactile sensor, a direction of the first acceleration and a direction of the second acceleration being identical.

For application in coordinate measuring machines having tactile sensors, it is helpful, for example, when the mutually displaceable parts in a probe head, for example the housing and the feeler holder, are separately equipped with position change sensors in each case. It is thereby possible to detect touching earlier from the difference between the corresponding measurement signals of the first and second sensors. It is particularly advantageous that the measurement rate of the position change sensors can be performed independently and therefore at a higher frequency than the measurement of the position of the coordinate measuring machine from which differentiated previously acceleration data were obtained.

In principle, an evaluation unit for evaluating the position change data and/or acceleration data of the position change sensor can be integrated in the measuring head or probe head in order to obtain as compact a system as possible. However, care must then be taken in the technical design that the evaluation only exhibits as little consumption of energy as possible, and that therefore there is only a slight generation of heat. Otherwise, the heat generated by the evaluation unit could have a negative influence on the measurement result. If appropriate, the evaluation unit is to be thermally decoupled from the measuring system.

It can be provided to check an acceleration measurement at regular intervals, in particular at a multiple of the system clock. This can be performed by updating the acceleration and integrating it to the appropriate speed, and further integrating it to the appropriate position. The position data thus obtained can then, for example, be compared with the data of the position sensors of the coordinate measuring machine that directly determine the position of the sensor in three spatial directions. It is thereby possible to prevent the measurements from drifting apart and to achieve more stable data as well as a reliable measurement.

It can then be provided in the case of the method for collision detection of a coordinate measuring machine that the desired value is a maximum value fixed for the coordinate measuring machine, and that the putting-into-a-safe-state is performed if the at least one change in position is greater than the maximum value. Alternatively, the maximum value can also be updated dynamically by a control unit of the coordinate measuring machine, for example as it occurs in the desired movement path. It is possible to provide a safety margin in order to avoid erroneous estimates.

An absolute value can be used in this way to determine a collision of the coordinate measuring machine with an obstacle.

In addition, it can be provided in a refinement that a first acceleration of the tactile sensor is measured by means of a first position change sensor, and at least one second acceleration of the housing structure is measured by means of at least one second position change sensor, the first acceleration being the desired value, and the second acceleration being compared with the desired value.

Furthermore, it is also possible to perform a cumulative comparison with a second desired value that is a fixed maximum value.

It is possible in this way to distinguish between a collision of the housing structure with an obstacle and a touching of the feeler against an object to be measured. In a collision of the housing structure of the coordinate measuring machine, both the position change sensors of the housing structure and of the feeler or of the sensor would behave in the same way, and output similar deviations from a desired movement of the coordinate measuring machine, or output a similar overshooting of the fixed maximum value. Given a touching of the feeler against an object to be measured, a difference would occur between the first position change sensor and the second position change sensor such that touching can be detected. In the event of a collision, in this case the signal of the housing structure leads the signal of the feeler, while, in the event of touching, the signal of the feeler leads that of the housing structure.

In the method for correcting image data, it can be provided in a preferred embodiment that the start signal is coupled to a start and the stop signal is coupled to an end of an exposure process of the sensor, which is an optical sensor, wherein the at least one change in position is an acceleration.

It is possible in this way to synchronize the exposure period very exactly with the detection of the path data. For example, to this end a start and stop trigger of the exposure, or an appropriate level signal for the duration of the exposure, could be coupled to the sensor.

Moreover, in principle it is also generally conceivable that the position change sensors are used in rotating/pivoting units in order to detect dynamic and static tilts during a pivoting cycle, this likewise rendering possible a more accurate correction of the measurement results than is possible with quasi-rigid models of the rotating/pivoting unit as subsystem of the overall coordinate measuring machine.

Moreover, it is generally conceivable in principle for the position change sensors to be used as an active feedback system for a control of the movement of the coordinate measuring machine, in particular in order to enable a jerk-free control of the coordinate measuring machine. Possible disturbances of such a jerk-free movement could be detected and taken into account by the position change sensors.

It is obvious that the features named above and still to be explained below can be used not only in the respectively specified combination, but also in other combinations or on their own without departing from the scope of the present invention.

BRIEF DESCRIPTION OF THE DRAWINGS

Exemplary embodiments of the invention are illustrated in the drawing, and explained in more detail in the following description. In the figures.

DETAILED DESCRIPTION OF THE PREFERRED EMBODIMENTS OF THE INVENTION

Figure 1:
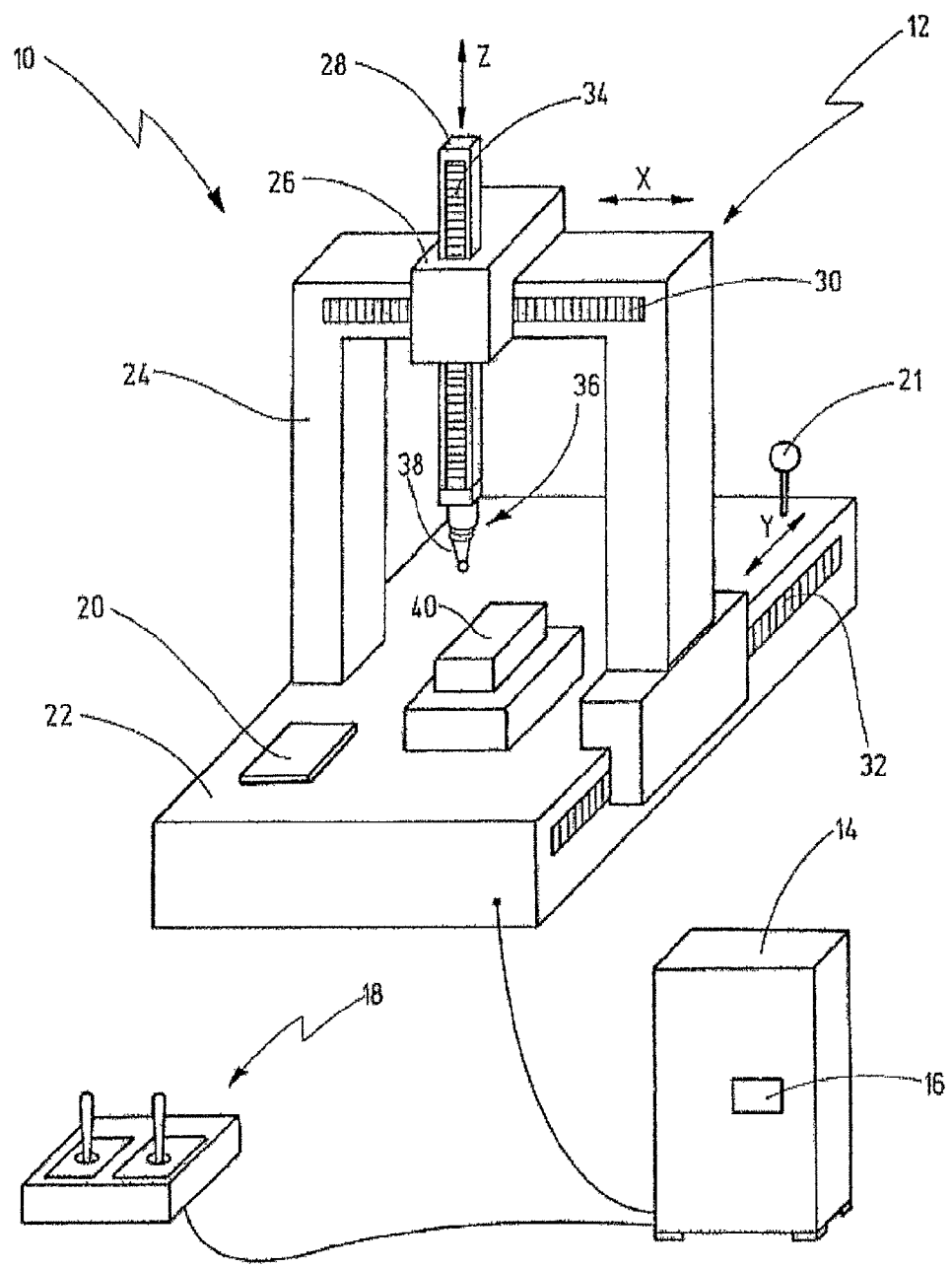
FIG. 1 shows a system for measuring an object with a coordinate measuring machine.

FIG. 1 shows a system 10 that can be used to carry out a method for collision detection or a method for correcting image data. The system 10 has a coordinate measuring machine 12 and a control unit 14 for controlling the coordinate measuring machine 12. The control unit 14 has an arithmetic logic unit 16, for example a computer.

The control unit 14 is illustrated purely schematically as a block; in principle, the control unit 14 can have all elements required for controlling the coordinate measuring machine 12, for example keyboards, monitors or a control console 18. Furthermore, the control unit 14 also comprises output means for outputting the data obtained by the coordinate measuring machine 12 in a suitable form, for example electronically or in paper form. Although the coordinate measuring machine 12 can also be operated manually by means of the control console 18, the control unit 14 is also capable of carrying out measurement and calibration processes in an automated fashion.

Furthermore, the system 10 can have a force measuring device 20, for example in the form of scales or a load cell. A calibration sphere 21 is further provided. The force measuring device 20 and the calibration sphere 21 are arranged on a base plate 22 of the coordinate measuring machine 12. The force measuring device 20 and the calibration sphere 21 serve to calibrate the coordinate measuring machine 12, such a calibration method being described, for example, in the publication EP 1 051 596 B1. The latter serves to determine correction parameters of the coordinate measuring machine 12, for example of a compliance matrix.

Provided on the base plate 22 is a portal 24 that can be displaced on the base plate 22 along a first axis (Y). Provided, in turn, on the portal 24 is a carriage 26 that can be displaced along the portal 24 in a second direction (X). Provided on the carriage 26 is a quill 28 that can be displaced along the carriage 26 in a third direction (Z). The three directions (X, Y, Z) are respectively perpendicular to one another and form the axes of an absolute coordinate system (X, Y, Z).

Provided on the portal 24 is a scale 30 in the X-direction, on the base plate 22 a scale 32 in the Y-direction, and on the quill 28 a scale 34 in the Z-direction. The scales 30, 32, 34 serve the purpose of reading out the position of a sensor 36 attached to the quill 28. To this end, the scales 30, 32, 34 are designed in such a way that it is possible to read off a respective coordinate manually; in particular, however, the scales 30, 32, 34 are designed in such a way that a respective coordinate is detected by an appropriate detecting device (not shown) and transmitted to the control unit 14 electronically. The scales 30, 32, 34 therefore serve as position sensors for detecting the position of the sensor 36.

In the illustrated embodiment, the sensor 36 fitted on the quill 28 has a probe or a probe tip 38 that is mounted in a deflectable fashion and serves to probe an object 40 to be measured.

The object 40 to be measured is arranged on the base plate 22, and can thus be probed and measured by moving the portal 24, the carriage 26 and the quill 28.

Figure 2A:
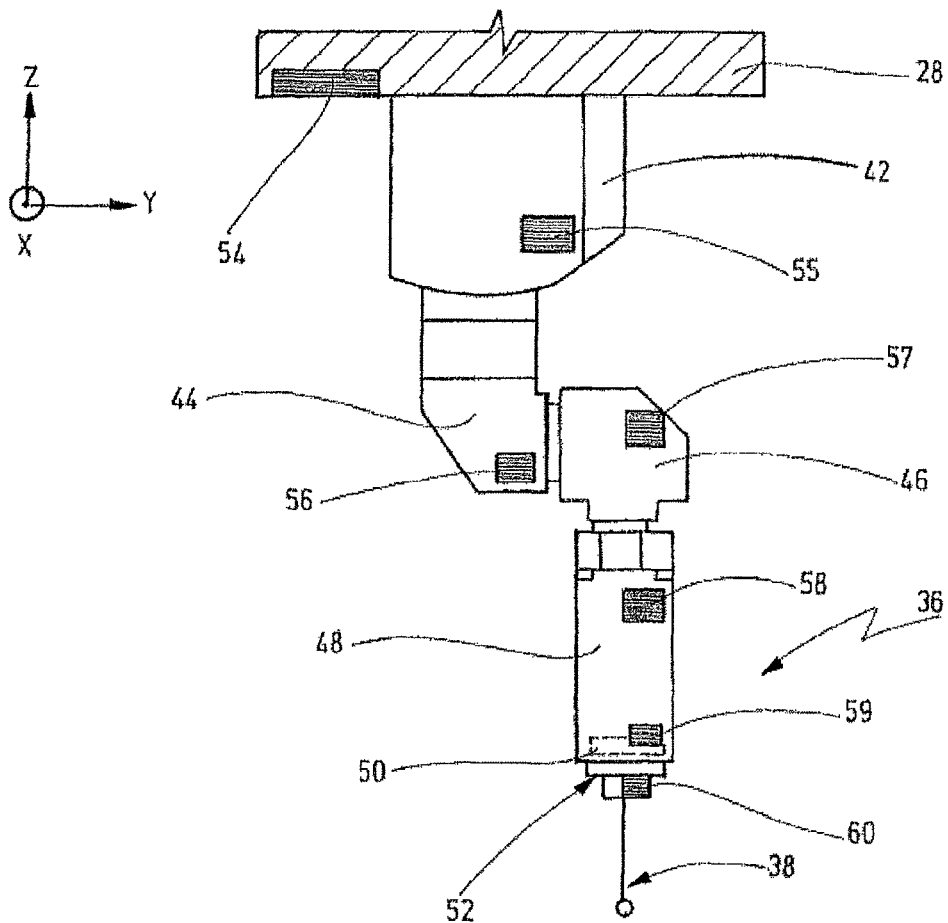
FIG. 2a shows a schematic view of possible sensor positions in a coordinate measuring machine comprising a tactile sensor.

FIG. 2a shows a schematic view of possible positions for position change sensors in the coordinate measuring machine 12.

Firstly, there is provided as a rule on the quill 28 a fastening device 42 on which a rotating/pivoting joint (DSG) 44 is provided. The DSG 44 serves the purpose of aligning the sensor 36 in any desired direction in order to be able to position the feeler pin 38 suitably on the object 40 to be measured. Provided on the DSG 44 is an adapter 46 that serves the purpose of providing a transition from the DSG 44 to a sensor head 48 in order to enable the use of various sensors 36 and/or sensor heads 48 with the same DSG 44.

Provided in the sensor head 48 is a probe holder 50 that holds a feeler plate 52. The actual probe 38 is then arranged on the feeler plate 52. The feeler plate 52 is arranged in the probe holder 50 in a fashion coupled by corresponding measuring sensors (not illustrated) that detect a deflection of the probe 38 or the feeler plate 52 and transmit it to the control unit 14 of the coordinate measuring machine 12.

Position change sensors that serve to detect a speed or an acceleration at the corresponding location of the appropriate element can be provided at a plurality of positions in the described arrangement. It is preferred to use acceleration sensors since, as second derivative of the position, the acceleration is subject to the most sensitive fluctuations, and therefore supplies the best data for the existing highaccuracy measurement requirements. The position change sensors can be provided for the purpose of measuring only a linear acceleration in one spatial direction, but it is also possible to measure rotational accelerations. It is preferred to provide at each of the described positions a packet of position change sensors that detect rotational accelerations about all three spatial axes (X, Y, Z) so that the acceleration of each element is completely detected.

In principle, position change sensors can be provided only at one, a plurality of, or else also at all the proposed positions.

A first packet of position change sensors 54 is located at one end of the quill 28. It is possible in this way to detect an acceleration of the appropriate end of the quill 28, and thus to detect a change in position that is, in particular, effected by moving the portal 24, the carriage 26 and the quill 28. Sensor data detected by the position change sensors 54 can be used, in particular, to monitor the control of the portal 24, the carriage 26 and the quill 28. Moreover, an adjustment can take place with the data of the scales 30, 32, 34.

Further position change sensors 55 or 56 can detect changes in position in the fastening device 42 and the DSG 44, which are also denoted together as a "sensor carrier". The detected changes in position by the position change sensors 55 and 56 can serve, in particular, for monitoring the control of the DSG 44 and a possible distortion of the DSG 44. It is possible in this way to detect an actual distortion of the DSG 44 without the need to appeal to model parameters.

A further possible packet of position change sensors 57 is located in the adapter 46. Such a sensor position offers similar advantages to those of the position change sensors 55 and 56 and can, for example, be used together with the position change sensors 55 and 56 for the purpose of better detection of the part of the overall system.

A further packet of position change sensors 58 is located in the sensor head 48 where, in particular, a packet of position change sensors 59 can be provided near the probe holder 50. An acceleration of the sensor head 48 in particular near the probe holder 50 can be detected and be compared with an acceleration of the probe 38 by means of the position change sensors 58 and 59. The detection of the acceleration of the probe 38 is served in this case by a further packet of position change sensors 60, which are provided on the probe or on the feeler plate 52. By comparing the data of the position change sensors 58 and/or 59 and 60, it is possible, for example, given a certain discrepancy between the acceleration data, to deduce therefrom that the probe 38 has probed the object 40 to be measured.

Figure 2B:
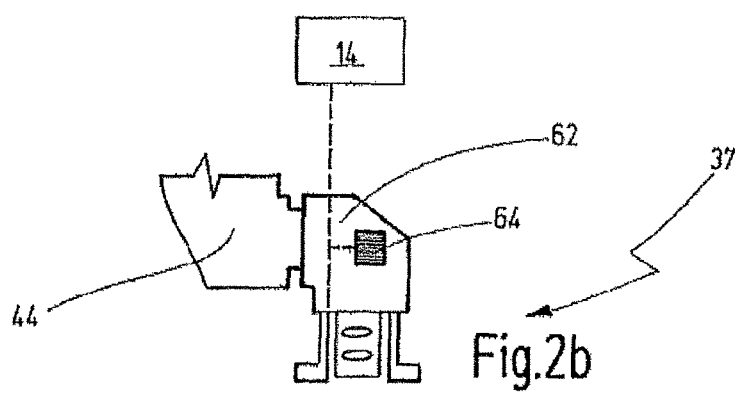
FIG. 2b shows a schematic view of possible sensor positions in a coordinate measuring machine comprising an optical sensor.

FIG. 2b shows a possible arrangement for the case in which an optical sensor 37 is used.

From the quill 28 down to the DSG 44, the design is the same as that described in FIG. 2a. However, the optical sensor 37, which is, for example, formed by a camera module 62, then directly adjoins the DSG 44. A packet of position change sensors 64 can then be arranged on the camera module 62.

In order to carry out a method for correcting image data of the camera module 62, it is provided to connect the position change sensors 64 and the camera module 62 to the control unit 14. It is possible in this way to synchronize the operation of the camera module 62 and the position change sensors 64. For example, the beginning of a recording operation of the camera module 62 and the end of a recording operation can be synchronized with the beginning and the end of a measurement operation of the position change sensors 64 so that appropriately matching image data and position change data are acquired. These can then be transmitted to the control unit 14 and evaluated, in particular for the correction of the image data.

Figure 3:
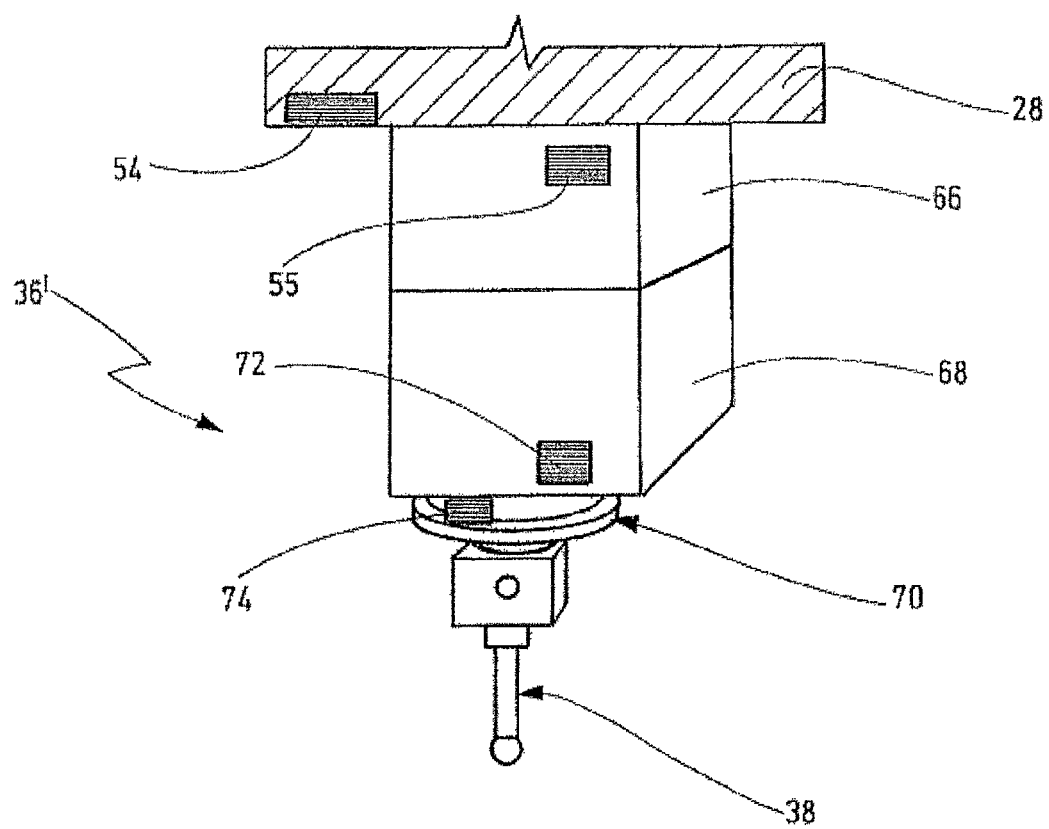
FIG. 3 shows a schematic view of possible sensor positions in a further coordinate measuring machine comprising a tactile sensor.

FIG. 3 shows a further tactile sensor 36' and possible positions for acquiring position change data. The further tactile sensor 36' is likewise provided on the quill 28 so that a packet of position change sensors 54 can likewise be provided on the quill 28. Fitted on the quill 28 is a head housing 66 which corresponds, for example, to the sensor carrier 42, 44 that is illustrated in FIG. 2a. A second packet of position change sensors 55 can correspondingly also be provided on the head housing 66.

Fitted on the head housing 66 is a probe replacement site 68 that serves to hold a probe plate 70. The probe plate 70 corresponds substantially to the feeler plate 52. The probe 38 is also fastened on the probe plate 70. The probe plate 70 is mounted correspondingly in the probe replacement site 68 so that a deflection of the probe 38 can be detected by means of suitable measuring sensors.

Accordingly, it is also possible here to provide a packet of position change sensors 72 in the probe replacement site 68, in particular as close as possible to the probe plate 70. A further packet of position change sensors 74 is then fitted on the probe plate 70 or on the probe 38 itself. By way of example, it is possible, in turn, to infer from the difference between the position change data of the position change sensors 72 and 74 that the object 40 to be measured has been probed.

As has already been mentioned, it is provided in principle that each sensor packet 54-60 or 72-74 comprises three rotational acceleration sensors. Of course, however, alternatives are also conceivable here. In particular, the position change sensors 54-60 can also comprise packets of 1 to 3 sensors that measure linear acceleration along appropriate axes. The position change sensors 64 can also be appropriately designed. The same holds true for the position change sensors 72 and 74. Sensor packets for measuring angular accelerations about one to three axes can, as already mentioned, particularly have the packets of position change sensors 54-60.

Of course, it is also possible to conceive combinations, in particular it can be provided that the packets of position change sensors 57-60 have a combination of two angular acceleration measuring sensors and a linear acceleration measuring sensor. The linear acceleration is preferably measured in this case in the Z-direction.

Figure 4:
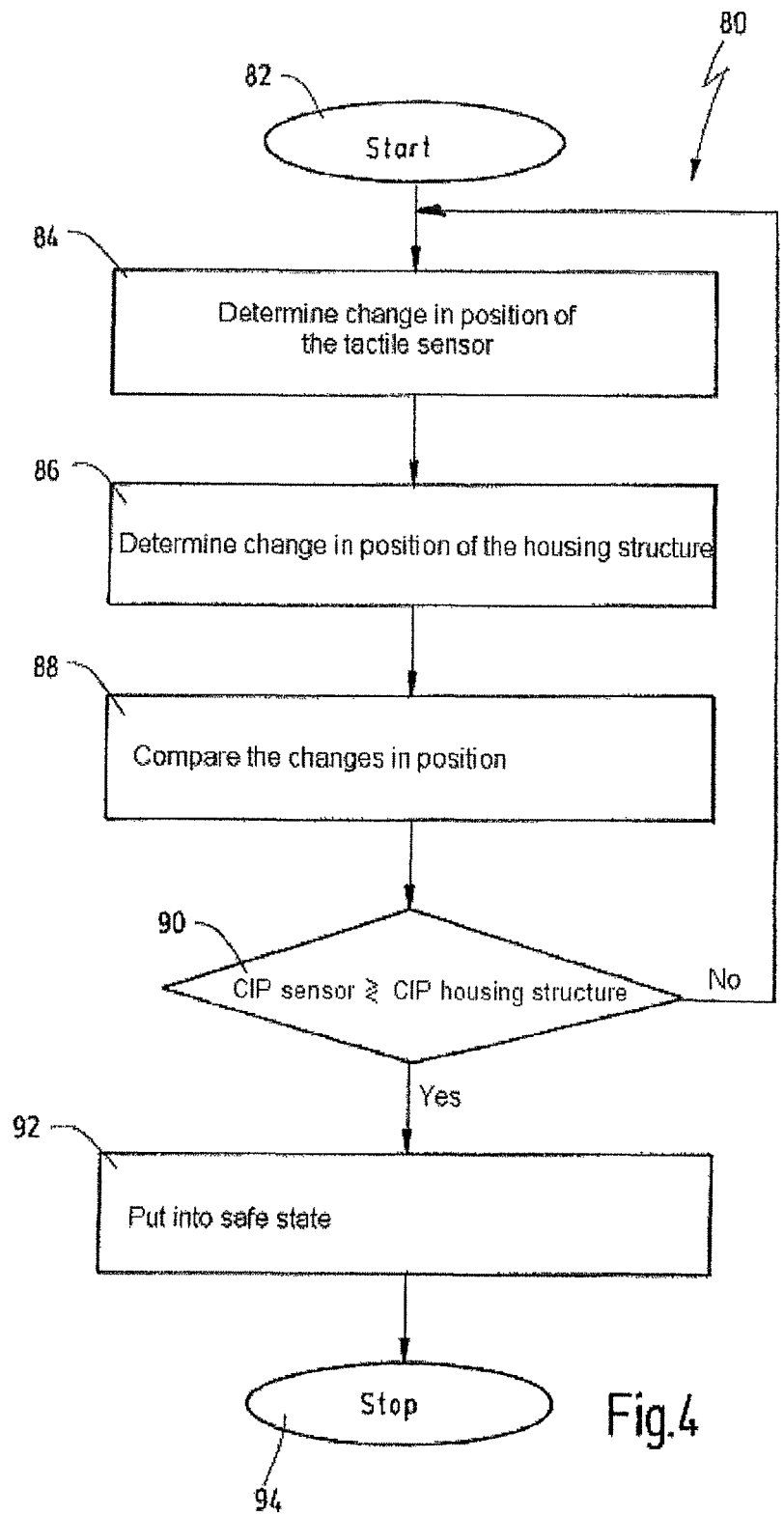
FIG. 4 shows a schematic flowchart of a method for collision detection of a coordinate measuring machine.

FIG. 4 shows a method 80 for collision detection of a coordinate measuring machine.

The method 80 begins with a step 82. A change in position, in particular an acceleration, of the tactile sensor 36 is detected continuously in a step 84. A change in position of a housing structure formed by the elements 24 to 28 and 42 to 50 is detected in a step 86, which can also run in parallel with step 84. Step 84 is, in particular, carried out by means of position change sensors 74 and 64 and 60, respectively. The position change sensors 54-59 and 72 serve the purpose of detecting the change in position of the housing structure in the context of step 86.

A comparison of the changes in position detected in steps 84 and 86 is carried out continuously in step 88.

In order to determine whether the probe 38 has probed the object 40 to be measured, a comparison is made in a step 90, in particular, as to whether a change in position of the sensor 36 that was detected by means of the position change sensors 60, for example, corresponds with a corresponding change in position of the housing structure that was detected by means of the position change sensors 59, for example. If the acceleration data correspond, the method is continued with step 84.

If a deviation is determined, the coordinate measuring machine 12 is put into a safe state in a step 92, for example by stopping the coordinate measuring machine 12 or moving it back by a specific measure.

Of course, it is possible in the context of the comparison in step 90 to provide a tolerance range that the deviation between the changes in position must leave for the deviation to be defined as a collision.

Of course, a further adjustment can be carried out in parallel, for example with maximum values for the acceleration of the coordinate measuring machine 12. Such an adjustment can, for example, serve the purpose of determining a collision, for example, between the sensor head 48 and an obstacle. If, for example, the changes in position determined in step 84 and step 86 correspond, but both overshoot the previously defined maximum value, it can be that a corresponding element of the housing structure has collided with an obstacle. A step 92 can also be appended in order to put the coordinate measuring machine 12 into a safe state.

Figure 5:
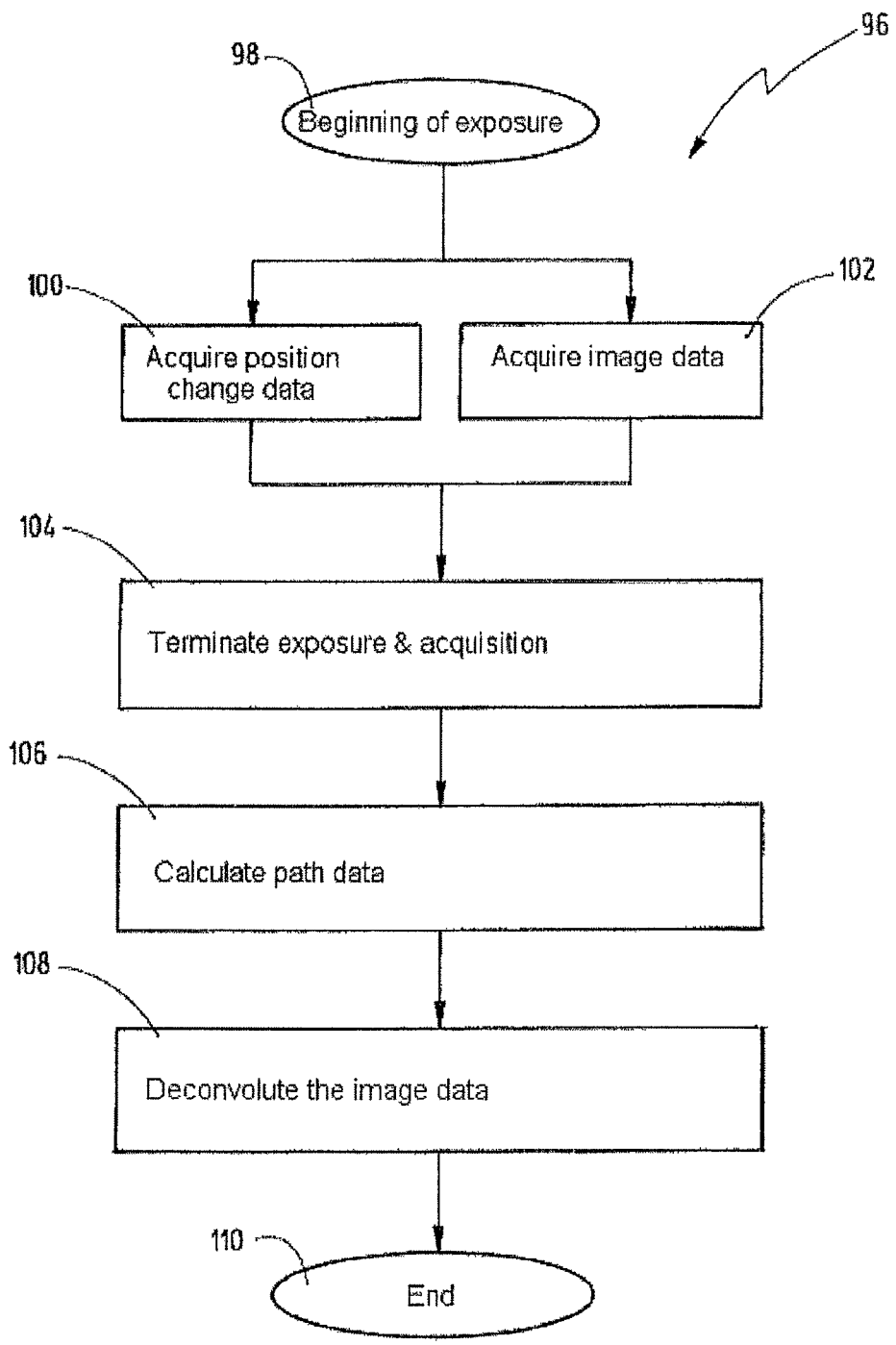
FIG. 5 shows a schematic flowchart of a method for correcting image data.

FIG. 5 shows a method 96 for correcting data of a non-contact sensor 37, in particular an optical one.

The method 96 begins with a step 98 that corresponds to the beginning of the exposure of the optical sensor 37. As has already been mentioned, the method can be used for all non-contact sensors 37; however, reference is made below only to an optical sensor 37.

The beginning of the exposure in step 98 is coupled to the position change sensors 64 for the control unit 14. A combination of the position change data detected in a step 100 by means of the position change sensors 64 with image data acquired in a parallel step 102 is attained in this way. Acquired acceleration data can thus be assigned to image data in a timed fashion. The acquisition of the position change data in step 100 and of the image data in step 102 ends in a step 104 when the exposure time of the optical sensor 37 ends.

In a step 106, the path data of the optical sensor 37 are now calculated, that is to say the path that the optical sensor 37 has completed during the measurement operation. For this purpose, the acceleration data acquired by each position change sensor are integrated so as to produce the corresponding speed data. The corresponding location data are obtained by renewed integration of the speed data. It is to be borne in mind here that a first constant, which is initially unknown, results upon the integration from the acceleration to the speed, while a second constant results upon the integration from the speed to the path. However, it is important to know the first constant, that is to say the speed of the optical sensor 37 at the beginning of the measurement operation. This can, for example, be zero, that is to say step 98 is begun while the optical sensor 37 is at rest. The second constant, which arises upon the integration of the speed to the path, need not be known. The second constant is required only to determine the absolute path data in the absolute coordinate system (X, Y, Z). However, it suffices for the present correction of the image data to have relative path data, that is to say the path profile between the location at the beginning of the measurement operation and the location at the end of the measurement operation.

If the acceleration sensor is read out repeatedly within the exposure time, a sum function can provide a good approximation of the integral. It is advantageous in principle to read out the acceleration sensor as often as possible within the exposure time. If only the values at the start and end of the exposure process were to be known, only a total value would be obtained without information on the path profile. However, when many intermediate values read out are to hand, the sum function and/or partial integrals can be used to determine the actual "exposure path", that is to say the path described by the optical sensor 37.

It is advantageously provided that the directions in which the accelerations are measured comprise the two lateral displacements within an image plane of the optical sensor 37, and the third direction is at right angles to the image plane, and therefore detects a defocus. Given alternative arrangements of the position change sensors and measuring direction, however, it is also possible for the data related to the image plane to be converted from the known spatial arrangements of the position change sensors, the circumstance of whether a linear or a rotational acceleration is being measured, and the known spatial arrangement of the optical sensor 37.

If the path data are determined in step 106, the acquired image data can be deconvoluted in a step 108. That is to say, the unsharpness of the image data, which has been caused by the movement of the optical sensor 37, can be removed by calculation on the basis of the known path data.

The desired corrected image data are therefore obtained at the end of step 108.

Finally, the method ends in a step 110.

What is claimed is:

1. A coordinate measuring machine having a sensor for measuring an object, and having a housing structure for holding and positioning the sensor, wherein at least one position change sensor is provided in order to detect a change in position of the sensor and of the housing structure, wherein the sensor for measuring the object is a tactile sensor, and a first position change sensor is provided in order to detect a first acceleration of the housing structure, and at least one second position change sensor is provided in order to detect a second acceleration of the tactile sensor, wherein a direction of the first acceleration and a direction of the second acceleration are identical.

2. The coordinate measuring machine according to claim 1, wherein a plurality of position change sensors are provided in order to detect a change in position of the sensor and of the housing structure in three spatial directions.

3. The coordinate measuring machine according to claim 1, wherein the at least one position change sensor is designed to detect a linear and/or rotational acceleration.

4. The coordinate measuring machine according to claim 1, wherein the at least one position change sensor is designed to detect a linear and/or rotational speed.

5. A method for collision detection of a coordinate measuring machine having a tactile sensor for measuring an object, and having a housing structure for holding and positioning the tactile sensor, having the following steps:

determining at least one change in position of the tactile sensor and of the housing structure by means of at least one position change sensor, comparing the at least one change in position with at least one corresponding desired value, and putting the coordinate measuring machine into a safe state if the at least one change in position deviates by a predetermined measure from the at least one corresponding desired value, wherein a first acceleration of the tactile sensor is measured by means of at least one first position change sensor, and wherein at least one second acceleration of the housing structure is measured by means of at least one second position change sensor, the first acceleration being the desired value, and the second acceleration being compared with the desired value.

6. The method according to claim 5, wherein the desired value is a maximum value fixed for the coordinate measuring machine, and the putting is performed if the at least one change in position is greater than the maximum value.

7. A method for correcting data of an optical sensor, measuring in a contactless fashion, of a coordinate measuring machine, having the following steps:

starting a measurement operation on the basis of a start signal, measuring at least one change in position by means of at least one position change sensor, a time profile of the change in position being detected as position change data, stopping the measurement operation on the basis of a stop signal, calculating path data of the optical sensor by means of integrating the position change data, and deconvoluting the image data by means of the path data.

8. The method according to claim 7, wherein the start signal is coupled to a start and the stop signal is coupled to an end of an exposure process of the optical sensor, and wherein the at least one change in position is an acceleration.

* * * * *